(12) United States Patent
Ahearn et al.

(10) Patent No.: US 10,667,110 B2
(45) Date of Patent: *May 26, 2020

(54) SYSTEM AND METHOD FOR USING AN ELECTRONIC LOCK WITH A SMARTPHONE

(71) Applicant: Schlage Lock Company LLC, Carmel, IN (US)

(72) Inventors: John Robert Ahearn, Pasadena, CA (US); Joseph Wayne Baumgarte, Carmel, IN (US); Gabriel Daniel Focke, Sunman, IN (US); Michael Scott Henney, Indianapolis, IN (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/233,952

(22) Filed: Dec. 27, 2018

(65) Prior Publication Data

US 2019/0141504 A1    May 9, 2019

Related U.S. Application Data

(63) Continuation of application No. 13/969,409, filed on Aug. 16, 2013, now Pat. No. 10,171,974.

(Continued)

(51) Int. Cl.
*H04W 4/80* (2018.01)
*G07C 9/00* (2020.01)
(Continued)

(52) U.S. Cl.
CPC .......... *H04W 4/80* (2018.02); *G07C 9/00174* (2013.01); *G07C 9/00571* (2013.01);
(Continued)

(58) Field of Classification Search
CPC combination set(s) only.
See application file for complete search history.

(56) References Cited

U.S. PATENT DOCUMENTS

| 6,405,035 B1 | 6/2002 | Singh |
| 8,922,333 B1 | 12/2014 | Kirkjan |

(Continued)

FOREIGN PATENT DOCUMENTS

| CN | 101765240 A | 6/2010 |
| CN | 101848438 A | 9/2010 |

(Continued)

OTHER PUBLICATIONS

H. Mika, H. Mikko and Y.o. Arto, "Practical Implementations of Passive and Semi-passive NFC Enabled Sensors," 2009 First International Workshop on Near Field Communication, Hagenberg, 2009, pp. 69-74 (continued) (Year: 2009).

(Continued)

*Primary Examiner* — Steven S Kelley
(74) *Attorney, Agent, or Firm* — Taft Stettinius & Hollister LLP

(57) ABSTRACT

A method, system or apparatus including a server that may receive information from a computer, store the information in a database at the server, determine a reader device to receive the information based on an analysis of a reader device identifier, and transmit viral data to a mobile device where the viral data includes at least a portion of the information.

17 Claims, 4 Drawing Sheets

Related U.S. Application Data

(60) Provisional application No. 61/684,070, filed on Aug. 16, 2012.

(51) Int. Cl.
    *H04W 12/06*     (2009.01)
    *H04W 84/18*     (2009.01)

(52) U.S. Cl.
    CPC .. *H04W 12/06* (2013.01); *G07C 2009/00793* (2013.01); *H04W 84/18* (2013.01)

(56) References Cited

U.S. PATENT DOCUMENTS

| | | | |
|---|---|---|---|
| 10,171,974 B2 * | 1/2019 | Ahearn | H04W 12/06 |
| 2006/0072755 A1 | 4/2006 | Oskari | |
| 2006/0224901 A1 | 10/2006 | Lowe | |
| 2009/0006834 A1 | 1/2009 | Rothman et al. | |
| 2009/0217718 A1 | 9/2009 | Porter | |
| 2009/0295571 A1 | 12/2009 | Hosey | |
| 2010/0075656 A1 | 3/2010 | Howarter et al. | |
| 2010/0097239 A1 | 4/2010 | Campbell et al. | |
| 2010/0135201 A1 | 6/2010 | Lewis et al. | |
| 2010/0261453 A1 * | 10/2010 | Menzel | H04B 5/0031 |
| | | | 455/411 |
| 2010/0283579 A1 | 11/2010 | Kraus et al. | |
| 2011/0105029 A1 * | 5/2011 | Takayashiki | H04W 8/245 |
| | | | 455/41.2 |
| 2011/0187505 A1 | 8/2011 | Faith et al. | |
| 2011/0281556 A1 * | 11/2011 | Choi | H04M 1/72583 |
| | | | 455/411 |
| 2011/0311052 A1 | 12/2011 | Myers et al. | |
| 2012/0280783 A1 | 11/2012 | Gerhardt et al. | |
| 2013/0091561 A1 | 4/2013 | Bruso et al. | |
| 2013/0127593 A1 | 5/2013 | Kuenzi | |
| 2013/0335193 A1 | 12/2013 | Hanson | |
| 2014/0005277 A1 | 1/2014 | Nakata et al. | |
| 2014/0049370 A1 | 2/2014 | Eberwine et al. | |
| 2014/0051407 A1 | 2/2014 | Ahearn et al. | |
| 2014/0051425 A1 | 2/2014 | Ahearn et al. | |

FOREIGN PATENT DOCUMENTS

| | | |
|---|---|---|
| CN | 102300204 A | 12/2011 |
| CN | 102426715 A | 4/2012 |
| EP | 2710562 A1 | 3/2014 |
| JP | 2010516554 A | 5/2010 |
| WO | 2011034482 A1 | 3/2011 |
| WO | 2011159921 A1 | 12/2011 |
| WO | 2012151290 A1 | 11/2012 |

OTHER PUBLICATIONS

Available at http://ieeexplore.ieee.org/stamp/stamp.jsp?tp=&anumber=5190420&isnumber=5190408 (Year: 2009).

International Search Report for PCT/US2013/055456 dated Nov. 8, 2013, 2 pages.
Written Opinion of the International Searching Authority for PCT/US2013/055456 dated Nov. 8, 2013, 6 pages.
European Search Report; European Patent Office; European Patent Application No. 13829338.6; dated Mar. 22, 2016; 10 pages.
European Examination Report; European Patent Office; European Patent Application No. 13829338.6; dated Feb. 1, 2017; 10 pages.
Second European Examination Report; European Patent Office; European Patent Application No. 13829338.6; dated Oct. 4, 2017; 11 pages.
"Exploring Centrality for Message Forwarding in Opportunistic Networks" by Kuang Xu, Victor O.K. Li and Jaewoo Chung; The 2010 IEEE Conference on Wireless Communications and Networking (WCNC), Sydney, NSW, Australia, Apr. 18-21, 2010. In Proceedings of the IEEE WCNC, 2010, p. 1-6 available at http://hdl.handle.net/10722/126111.
International Search Report for PCT/US2013/055459 dated Nov. 8, 2013, 2 pages.
Written Opinion of the International Searching Authority for PCT/US2013/055459 dated Nov. 8, 2013, 5 pages.
Canadian First Office Action; Canadian Intellectual Property Office; Canadian Patent Application No. 2,886,378; dated Jul. 5, 2016; 4 pages.
Chinese Search Report; State Intellectual Property Office of China; Chinese Application No. 201380052876.4; dated Apr. 26, 2016; 2 pages.
Chinese Office Action; State Intellectual Property Office of China; Chinese Application No. 201380052876.4; dated May 5, 2016; 7 pages.
Extended European Search Report; European Patent Office; EP Application No. 13829722.1; dated Apr. 8, 2016; 7 pages.
Canadian Office Action; Canadian Intellectual Property Office; Canadian Patent Application No. 2,886,378; dated May 11, 2017; 4 pages.
Canadian Office Action; Canadian Intellectual Property Office; Canadian Patent Application No. 2,886,378; dated Apr. 24, 2018; 4 pages.
Chinese Office Action; State Intellectual Property Office of China; Chinese Application No. 201380052876.4; dated Oct. 11, 2017; 5 pages.
European Examination Report; European Patent Office; European Patent Application No. 13829722.1; dated Jun. 13, 2018; 10 pages.
Mexican Office Action; Mexican Patent Office; Mexican Application No. MX/a/2015/002063; dated Mar. 7, 2018; 7 pages.
Mexican Office Action (second); Mexican Patent Office; Mexican Application No. MX/a/2015/002063; dated Jul. 27, 2018; 10 pages.
Indian Examination Report; Indian Intellectual Property Office; Indian Patent Application No. 1518/CHENP/2015; dated Jan. 10, 2019; 8 pages.
Canadian Office Action; Canadian Intellectual Property Office; Canadian Patent Application No. 2,886,378; dated Apr. 30, 2019 2019; 4 pages.

* cited by examiner

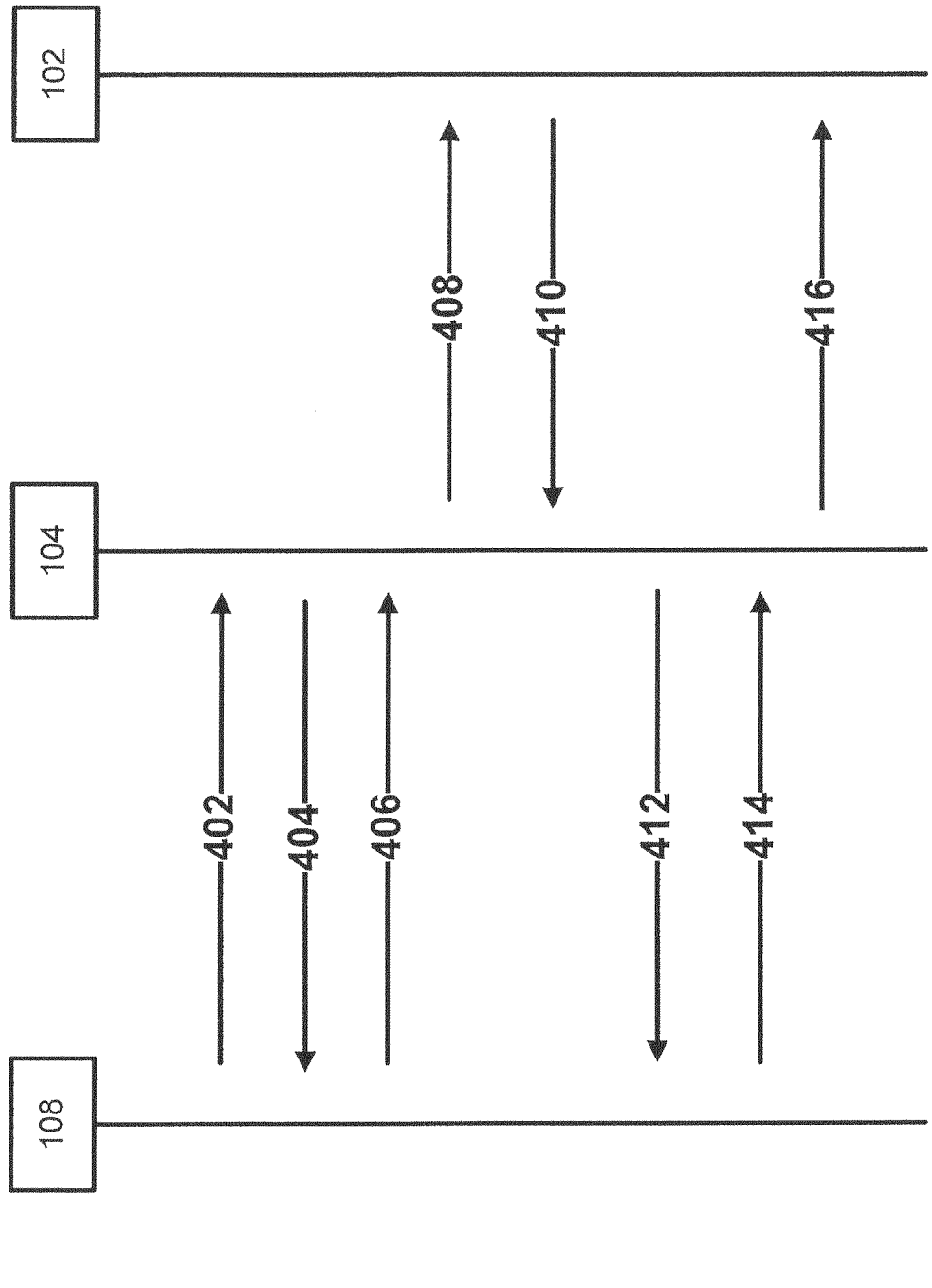

SYSTEM AND METHOD FOR USING AN ELECTRONIC LOCK WITH A SMARTPHONE

CROSS-REFERENCE TO RELATED APPLICATIONS

The present application is a continuation of U.S. application Ser. No. 13/969,409 filed Aug. 16, 2013 and issued as U.S. Pat. No. 10,171,974, which claims the benefit of U.S. Provisional Patent Application No. 61/684,070 filed on Aug. 16, 2012, the contents of each application incorporated herein by reference in their entirety.

BACKGROUND

Various devices may be employed for providing information, such as updated information, to a reader device. Some existing systems have various shortcomings relative to certain applications. Accordingly, there remains a need for further contributions in this area of technology.

SUMMARY

One embodiment of the present invention is a unique wireless communication system and method. Other embodiments include apparatuses, systems, devices, hardware, methods, and combinations for a wireless communication system. Further embodiments, forms, features, aspects, benefits, and advantages of the present application shall become apparent from the description and figures provided herewith.

BRIEF DESCRIPTION OF THE FIGURES

The description herein makes reference to the accompanying figures wherein like reference numerals refer to like parts throughout the several views, and wherein:

FIG. 4 is a schematic time sequence diagram of an exemplary process for communicating with a reader device.

DETAILED DESCRIPTION OF THE ILLUSTRATIVE EMBODIMENTS

Figure 1:
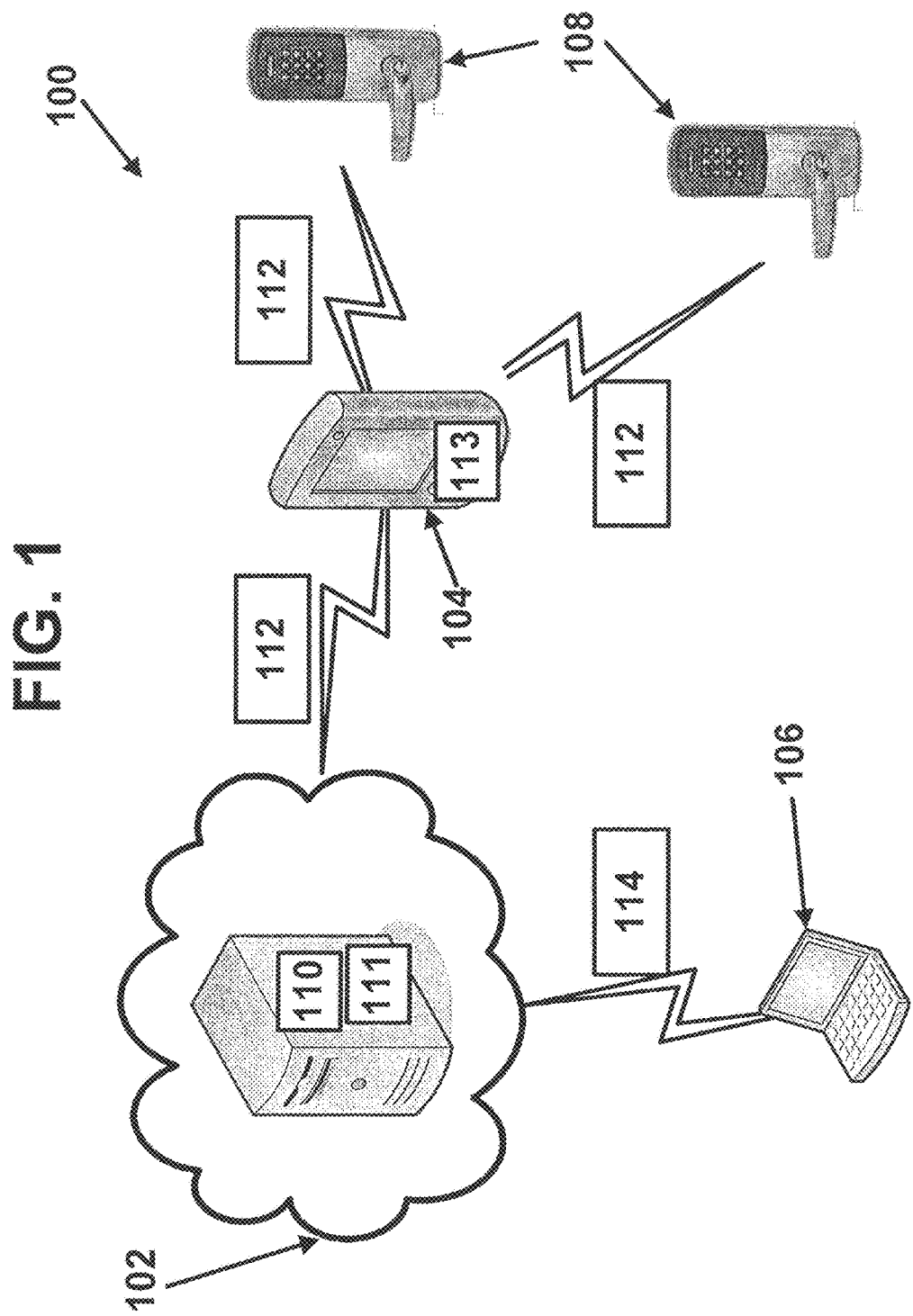
FIG. 1 is a schematic block diagram of an exemplary system according to one form of the present invention.

For the purposes of promoting an understanding of the principles of the invention, reference will now be made to the embodiments illustrated in the drawings and specific language will be used to describe the same. It will nevertheless be understood that no limitation on the scope of the invention is hereby intended. Any alterations and further modifications in the described embodiments, and any further applications of the principles of the invention as described herein are contemplated as would normally occur to one skilled in the art to which the invention relates.

FIG. 1 illustrates an exemplary system 100. In the embodiment shown in FIG. 1, the system 100 is an access control system. However, it is contemplated that in other embodiments, the system 100 may be directed to a payment system, a transit system, or any other system that utilizes a credential or a unique identifier. The system 100 generally includes a server or credential management device 102, a mobile device 104, a computer or computing device 106, and a reader device 108. The server 102 may provide a credential management service which, in the illustrated embodiment, includes a cloud application 110. The credential management service, via the cloud application 110, may generally maintain a database 111 of access control information, alarm information, and/or audit history information for various assets. The server 102, via cloud application 110, may provide certain services related to access control, credentials, and other information and/or functions related to the reader device 108 such as, for example, statuses, configurations, updates, key management, credential management, tracking, notifications, etc., as will be discussed in greater detail below. It is also contemplated that the type of data stored in the database 111 may vary depending on the type of system (e.g., access control system, payment system, transit system, etc.). It is further contemplated that the server 102 may include multiple servers. Additionally, the server 102 may communicate with the mobile device 104 and/or the computer 106 at least partially via the Internet.

In the embodiment shown in FIG. 1, the mobile device 104 is a mobile phone such as, for example, a cell phone or smartphone. However, it is contemplated that in other embodiments, the mobile device 104 may be a tablet computer, a smartcard, or any or any other mobile computing or communication device that can store data and communicate with the reader device 108. It is also contemplated that the computer 106 may be any type of computing device such as, for example, a desktop computer, a laptop computer, a tablet computer, a mobile device (e.g., a smartphone), and/or other suitable computing devices know to those skilled in the art. In the embodiment shown in FIG. 1, the reader device 108 is associated with an electronic lock and is configured to communicate with the mobile device 104. However, it is contemplated that in other embodiments, the reader device 108 may be any other type of device configured to communicate with the mobile device 104 and receive and/or process credential information or a unique identifier.

In some embodiments, the system 100 utilizes one or more mobile devices 104 as a transport or delivery mechanism for delivering information (e.g., access privileges) to the reader device 108 and/or for receiving alarm information and/or audit history feedback from the reader device 108. The mobile device 104 may include a wireless personal area network transceiver, such as a BLUETOOTH transceiver, configured to communicate with a wireless personal area network transceiver, such as a BLUETOOTH transceiver, that is part of the reader device 108. As used herein, the term BLUETOOTH includes BLUETOOTH Low Energy (BLE). It is contemplated that the mobile device 104 and the reader device 108 may communicate via a protocol other than BLUETOOTH such as, for example, near field communication (NFC) or any other appropriate communication protocol. The reader device 108 may be integrated into an electronic lock or be associated with an electronic lock. Other types of suitable reader devices 108 are also contemplated as would occur to those skilled in the art.

The reader devices 108 (e.g., readers and/or electronic locks) may be incorporated into doors or other access restriction structures or devices. The reader device 108 may be used to secure a door at a residential property or a commercial property. The mobile device 104 is configured to wirelessly communicate with the cloud application 110 in the server 102 via an Internet connection, which may utilize, for example, a cellular data network or other types of wireless communication networks. The mobile device 104 includes a memory for storing viral data 112 such as, for example, access control information, alarm information, and/or audit histories. The mobile device 104 may be configured to transmit feedback data in real-time back to the server 102 including the cloud application 110. The mobile device 104 is configured to implement "viral data" which includes data that does not pertain to a particular user, but generally pertains to several users. Furthermore, the user is generally unaware that the user is delivering and/or receiving viral data 112.

Examples of operations that use viral data 112 in the system 100 may include: database updates being sent from the server 102 to the reader device 108 via the mobile device 104; door status updates, battery status, door audit information, and/or other statuses sent from the reader device 108 to the server 102 via the mobile device 104; a lock configuration sent from the server 102 to the reader device 108 via the mobile device 104; credentials deleted or created (online or offline) via any node (e.g., mobile device 104 and/or computer 106) in the system 100; user tracking implemented by the mobile device 104 sending reader device 108 identification (11)) information to the server 102 when the mobile device 104 makes a connection with the reader device 108; update the data security algorithm or the key management algorithm by sending the updated algorithm from the server 102 to the reader device 108 via the mobile device 104; lock maintenance information may automatically be sent from the reader device 108 to the server 102 via the mobile device 104; and/or the server 102 may send notifications to one or more mobile devices 104 such as, for example, "Please close Door X" when the server 102 knows Door X is open and a mobile device 104 is in the vicinity of the door, or when a door database is out of date, a message may be sent to a mobile device 104 of a system administrator.

The operations that use viral data 112 described above may be implemented or accomplished with an application 113 on the mobile device 104. The application 113 may run in the background of the mobile device 104 such that the user of the mobile device 104 may not be aware that the application 113 is running. With the application 113 running in the background, the mobile device 104 will be able to connect to both the server 102 and the reader device 108 without the user being aware of the connection and/or data communications/transfers occurring. When the mobile device 104 establishes a connection with the reader device 108, the mobile device 104 may send the 11) of the reader device 108 and the ID of the mobile device 104 to the server 102. The server 102 may analyze the two IDs to determine whether to grant or deny permission for the mobile device 104 to deliver and/or receive the viral data 112. Accordingly, the server 102 may reply back to the mobile device 104 with a grant/deny message, and/or send any updates as viral data 112 to the reader device 108 using the mobile device 104 as the communication pipeline.

It is contemplated that updates and/or new information stored at the database 111 at the server 102 may occur dynamically through the mobile device 104 without the user of the mobile device 104 performing any action. In one embodiment, the mobile device 104 does not have to come in direct contact with the reader device 108 in order for the update to take place. For example, the mobile device 104 may be within a BLUETOOTH connection range of the reader device 108, in which case the mobile device 104 may deliver viral data 112 to and/or receive viral data 112 from the reader device 108 as the mobile device 104 is passing in proximity to the reader device 108.

The computer 106 may be used to create, update, or otherwise modify access information 114 stored at the server 102. Generally, when the server 102 receives access information 114 from the computer 106 that is to be transmitted to a particular reader device 108, the server 102 (via the cloud application 110) transmits the access information in the form of viral data 112 to some or all of the mobile devices 104 of users who have access privileges to the reader device 108 that is to be updated. However, it should be understood that the users do not necessarily have to have access privileges in order to update the access information. The server 102 (via the cloud application 110) may transmit the new or updated data to only the mobile devices 104 that interact with the particular reader device 108 most frequently. As another example, the viral data 112 for the reader device 108 may be delivered to each user (i.e., via mobile devices 104) who has immediate access to that reader device 108 so that the next user to approach the reader device 108 will deliver that viral data 112 to the particular reader device 108. It is contemplated that the viral data 112 may also include firmware updates and/or activation information for the reader device 108.

In one embodiment, when the viral data 112 is delivered by the mobile device 104, the mobile device 104 may report back to the server 102 to verify that the viral data 112 was successfully transferred. Other mobile devices 104 may then be updated by the server 102 to remove that particular update (i.e., delete the viral data 112). It is contemplated that this viral data updating technique may be used with any number of doors and/or reader devices 108.

In some embodiments, the mobile device 104 may receive alarm information and/or audit histories/trails in the form of viral data 112 from a particular reader device 108 immediately whenever someone visits the reader device 108 and/or the door. It is contemplated that to ensure the viral data 112 is successfully delivered to the server 102, the viral data 112 may be transmitted to multiple mobile devices 104 until the reader device 108 receives an update and/or notification that the latest alarm information and/or audit histories/trails were received at the server 102. Furthermore, it is contemplated that the viral data 112 from the reader device 108 may be delivered to the server 102 immediately upon receipt. The server 102 may store the received alarms and/or audit trails in the database 111. A user may also utilize the computer 106 to access and/or retrieve the alarms and/or audit trails in the database 111.

Generally, the memory of the mobile device 104 stores the viral data 112 (e.g., access privileges, alarms, and/or audit history data) so that the viral data 112 can be transported from the reader device 108 to the server 102 via the mobile device 104. Each credential holder (i.e., mobile device 104) has virtually unlimited memory for viral data 112 such as, for example, access privileges, alarm information, audit history data, firmware updates, and/or any other data to be shared between the server 102 and the reader 108. In one embodiment, the viral data 112 is transmitted from the reader device 108 to the server 102 immediately, which provides near real-time performance.

The use of viral data 112 in the system 100 may provide control of off-line reader devices 108 (e.g., electronic locks) and may eliminate the need to tour the reader devices 108 to provide updates to the reader devices 108 or gather alarms and/or audit histories from the reader devices 108.

Figure 2:
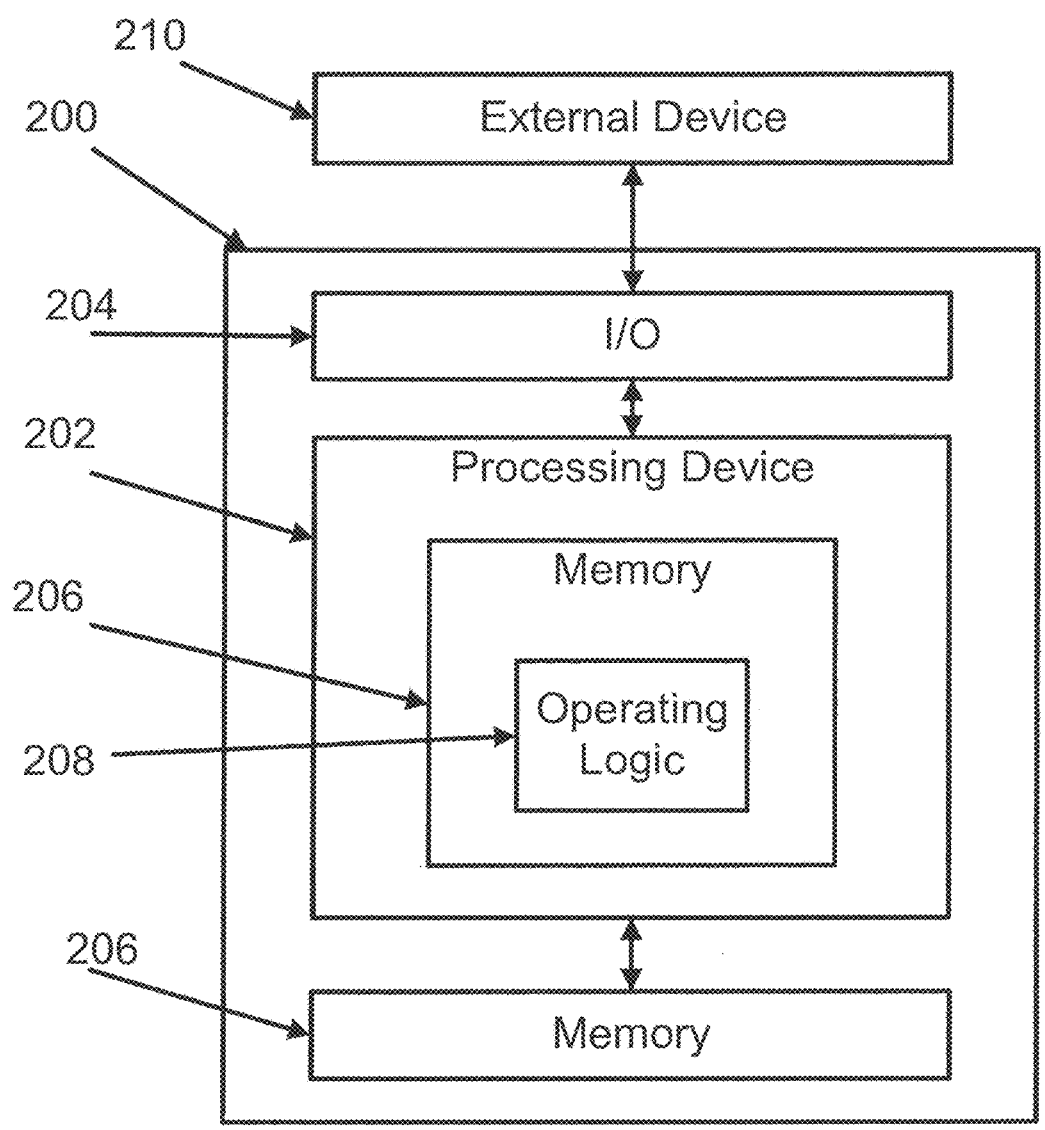
FIG. 2 is a schematic block diagram of an exemplary computing device.

FIG. 2 is a schematic block diagram of a computing device 200. The computing device 200 is one example of a server, a mobile device, a computer, and/or a reader device configuration that may be utilized in connection with the server 102, the mobile device 104, the computer 106, and/or the reader device 108 shown in FIG. 1. The computing device 200 includes a processing device 202, an input/output device 204, memory 206, and operating logic 208. Furthermore, computing device 200 communicates with one or more external devices 210.

The input/output device 204 allows the computing device 200 to communicate with the external device 210. For example, the input/output device 204 may be a transceiver, a network adapter, a network card, an interface, or a communication port (e.g., a USB port, serial port, parallel port, an analog port, a digital port, VGA, DVI, HDMI, FireWire, CAT 5, or any other type of communication port or interface). The input/output device 204 may be include hardware, software, and/or firmware. It is also contemplated that the input/output device 204 may include more than one of these adapters, cards, or ports.

The external device 210 may be any type of device that allows data to be inputted or outputted from the computing device 200. For example, the external device 210 may be a mobile device, a reader device, other electronic equipment, a handheld computer, a diagnostic tool, a controller, a computer, a server, a processing system, a printer, a display, an alarm, an illuminated indicator such as a status indicator, a keyboard, a mouse, or a touch screen display. Furthermore, it is contemplated that the external device 210 may be integrated into the computing device 200. It is further contemplated that there may be more than one external device in communication with the computing device 200.

Processing device 202 can be a programmable type, a dedicated hardwired state machine, or any combination thereof. The processing device 202 may further include multiple processors, Arithmetic-Logic Units (ALUs), Central Processing Units (CPUs), Digital Signal Processors (DSPs), or the like. Processing devices 202 with multiple processing units may utilize distributed, pipelined, and/or parallel processing. Processing device 202 may be dedicated to performance of just the operations described herein or may be utilized in one or more additional applications. In the depicted form, processing device 202 is of a programmable variety that executes algorithms and processes data in accordance with operating logic 208, as defined by programming instructions (such as software or firmware) stored in memory 206. Alternatively or additionally, the operating logic 208 for the processing device 202 is at least partially defined by hardwired logic or other hardware. The processing device 202 may include one or more components of any type suitable to process the signals received from the input/output device 204 or elsewhere, and to provide desired output signals. Such components may include digital circuitry, analog circuitry, or a combination of both.

Memory 206 may be of one or more types, such as a solid-state variety, electromagnetic variety, optical variety, or any combination thereof. Furthermore, memory 206 can be volatile, nonvolatile, or a combination of these types, and some or all of memory 206 can be of a portable variety, such as a disk, tape, memory stick, cartridge, or the like. Additionally, memory 206 can store data that is manipulated by the operating logic 208 of the processing device 202, such as data representative of signals received from and/or sent to input/output device 204 in addition to or in lieu of storing programming instructions defining operating logic 208, just to name one example. As shown in FIG. 2, memory 206 may be included with the processing device 202 and/or coupled to the processing device 202.

Figure 3:
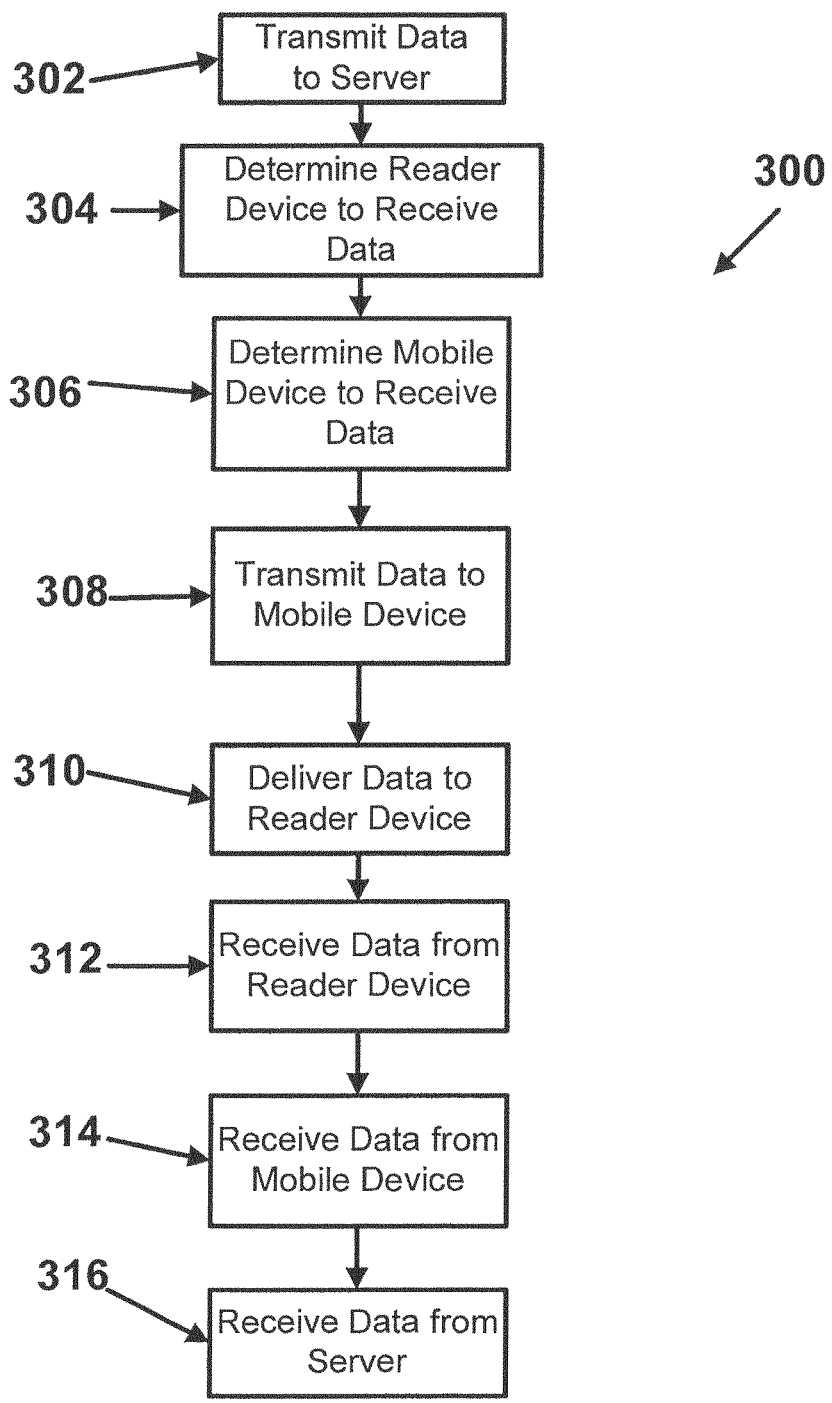
FIG. 3 is a schematic flow diagram of an exemplary process for communicating with a reader device.

FIG. 3 illustrates a schematic flow diagram of an exemplary process 300 for updating information in a reader device. Operations illustrated for all of the processes in the present application are understood to be examples only, and operations may be combined/divided and added/removed as well as re-ordered in whole or in part, unless explicitly stated to the contrary.

Process 300 begins at operation 302 in which a user may use the computer 106 to create, update, and/or modify access control information 114 that is transmitted and/or stored at the server 102. The server 102 may store the access control information 114 in the database 111.

Process 300 then proceeds from operation 302 to operation 304. At operation 304, the server 102, via the cloud application 110, determines which reader device 108 should receive new or updated information or data. The determination may be based on the content of the access control information 114 that is to be delivered to a reader device 108. For example, the information 114 may include access rights for a particular reader device 108. It is contemplated that more than one reader device 108 may receive the information 114, for example, in situations where several doors in a building have overlapping user access rights.

Process 300 then proceeds from operation 304 to operation 306. At operation 306, the server 102, via the cloud application 110, determines which mobile devices 104 should be used to virally transfer the information 114 from the server 102 to the reader device 108. The server 102, via the cloud application 110, may determine the targeted mobile devices 104 based on the access rights associated with each mobile device 104. For example, the server 102, via the cloud application 110, may transmit the information 114 in the form of viral data 112 to some or all of the mobile devices 104 of users who have access privileges to the reader device 108 (and the associated door) that is to receive the information 114. For example, the server 102, via the cloud application 110, may transmit the viral data 112 to only the mobile devices 104 that interact with the particular reader device 108 most frequently. As another example, the viral data 112 for the reader device 108 may be delivered to each mobile device 104 that has access to the particular reader device 108 immediately so that the next mobile device 104 to interact with the particular reader device 108 will deliver that viral data 112 to the reader device 108 as soon as possible.

Process 300 then proceeds from operation 306 to operation 308. At operation 308, the server 102, via the cloud application 110, transmits at least a portion of the information 114 in the form of viral data 112 to one or more of the mobile devices 104. The server 102 and the mobile devices 104 may communicate over an Internet connection. However, it is contemplated that other communication protocols and/or methods may be used in place of or in addition to the Internet connection.

Process 300 then proceeds from operation 308 to operation 310. At operation 310, one of the mobile devices 104 may deliver the viral data 112 to the reader device 108. For example, a user of the mobile device 104 may be attempting to access a secured room using the BLUETOOTH and/or NFC transceiver in the mobile device 104. Without the user's knowledge, the mobile device 104 may transfer a credential and/or other data for the access request, but the mobile device 104 will also transfer the viral data 112 to the reader device 108. The reader device 108 will then store the viral data 112 in the appropriate location in memory and utilize the viral data 112. As another example, the mobile device 104 may be passing by or in the vicinity of the reader device 108 in which case the mobile device 104 may connect to the reader device 108 without the mobile device 104 attempting to access a secured area.

Process 300 then proceeds from operation 310 to operation 312. At operation 312, the reader device 108 may send various data to the mobile device 104. For example, the reader device 108 may send a confirmation that the viral data 112 was successfully stored and/or installed in the reader device 108. As another example, the reader device 108 may transmit alarms and/or audit information to the mobile device 104. It is contemplated that the reader device 108 may transfer alarm information and/or audit information in the form of viral data 112 to one or more mobile devices 104 independent of receiving new and/or updated information from the server 102.

Process 300 then proceeds from operation 312 to operation 314. At operation 314, the mobile device 104 transfers the viral data 112 that the mobile device 104 received from the reader device 108 to the server 102. The server 102 and the mobile device 104 may communicate via an Internet connection. If the viral data 112 received from the mobile device 104 is a confirmation of a successful update, the server 102, via the cloud application 110, may notify the computer 106 and/or send a command to the other mobile devices 104 that also received the viral data 112 to delete the viral data 112 since the reader device 108 has already been updated successfully. If the viral data 112 constitutes alarm information and/or audit histories, the server 102 may store the alarm information and/or audit histories in the database 111.

Process 300 then proceeds from operation 314 to operation 316. At operation 316, the computer 106 may download the alarm information and/or audit histories from the database 111 at the server 102.

FIG. 4 is a schematic time sequence diagram illustrating another exemplary process 400 for communicating viral data 112 between the server 102 and the reader device 108 via the mobile device 104. Operations illustrated for all of the processes in the present application are understood to be examples only, and operations may be combined/divided and added/removed as well as re-ordered in whole or in part, unless explicitly stated to the contrary.

Process 400 begins with operation 402 in which the reader device 108 advertises to one or more mobile devices 104 that the reader device 108 is available for communication or connection. The reader device 108 may advertise to the mobile devices 104 by transmitting a BLUETOOTH signal continuously or intermittently.

Process 400 then proceeds from operation 402 to operation 404. At operation 404, the mobile device 104 responds to the advertisement transmitted by the reader device 108 by sending one or more response messages which in turn initiate and/or establish a connection between the mobile device 104 and the reader device 108 via BLUETOOTH communication, for example.

Process 400 then proceeds from operation 404 to operation 406. At operation 406, the reader device 108 may transmit a message that includes an encrypted reader device identification (ID) to the mobile device 104 via the BLUETOOTH communication. It is contemplated that a unique identifier other than a reader device ID may be transmitted to the mobile device 104. Furthermore, it is contemplated that the mobile device 104 reader device ID may not necessarily be encrypted when it is transmitted to the mobile device 104.

Next, process 400 proceeds from operation 406 to operation 408. At operation 408, the mobile device 104 may transmit a message to the server 102 that includes the encrypted reader device ID and the mobile device ID. The server 102 may decrypt the reader device ID. In addition, the server 102 may analyze the reader device ID and the mobile device ID to determine whether any new or updated information exists for the reader device 108 and/or to verify that the mobile device 104 and the reader device 108 should communicate viral data 112 with one another.

Process 400 proceeds from operation 408 to operation 410. At operation 410, the server 102 transmits one or more messages to the mobile device 104, which may include new and/or updated information such as, for example, a user database, time and date, and/or reader configuration updates. It is contemplated that the information from the server 102 may be encrypted, and the server 102 and the mobile device 104 may communicate via an Internet connection.

Next process 400 proceeds from operation 410 to operation 412. At operation 412, the mobile device 104 sends the information from the server 102 (e.g., an encrypted user database, time and date, and/or reader configuration updates) to the reader device 108 via BLUETOOTH communication. The reader device 108 may then store the received information and utilize the information in an operation.

Process 400 proceeds from operation 412 to operation 414. At operation 414, the reader device 108 transmits a message to the mobile device 104, in which the message may include a confirmation of receipt of the information from the server 102. Additionally or alternatively, the message may also include status information such as, for example, door, battery, audit, and/or maintenance information. It is also contemplated that the status information may be encrypted.

Next process 400 proceeds from operation 414 to operation 416. At operation 416, the mobile device 104 may send the confirmation and/or status message from the reader device 108 to the server 102. The server 102 may then process and/or store confirmation and/or the door, battery, audit, and/or maintenance information from the reader device 108 in the database 111 for analysis and/or any other operation.

The various aspects of the process 300 and/or 400 in the present application may be implemented in the operating logic 208 as operations by software, hardware, artificial intelligence, fuzzy logic, or any combination thereof, or at least partially performed by a user or operator. In certain embodiments, operations represent software elements as a computer program encoded on a computer readable medium, wherein the server 102, the mobile device 104, the computer 106, and/or the reader device 108 performs the described operations when executing the computer program.

One aspect of the present application may include a method, comprising: receiving information at a server; storing the information in a database at the server; determining a reader device that is to receive the information based on an analysis of the information; selecting one or more mobile devices to deliver the information to the reader device; and transmitting viral data to the one or more mobile devices, wherein the viral data includes at least a portion of the information.

Features of the aspect of the present application may include: transmitting the viral data to the reader device from one of the mobile devices; wherein the mobile device and reader device communicate via near field communication; transmitting audit information from the reader device to one of the mobile devices; receiving the audit information at the server from one of the mobile devices; and storing the audit information in the database at the server; downloading at least a portion of the audit information from the database at the server via a computer; wherein the selecting is based on which mobile devices have access to the reader device;

receiving a notification message at the server from the one mobile device, wherein the notification message indicates the reader device was successfully updated; and transmitting a command from the server to all of the other mobile devices to delete the viral data; wherein the information comprises updated access rights for the reader device; wherein the viral data includes a firmware update for the reader device.

Another aspect of the present application may include a system, comprising: a server configured to provide a cloud service; one or more mobile devices; and a reader device; and wherein the server is configured to: receive information and store the information in a database at the server, determine the reader device that is to receive the information based on an analysis of the information, select one or more mobile devices to deliver the information to the reader device, and transmit viral data to the one or more mobile devices, wherein the viral data includes at least a portion of the information, wherein the mobile device is configured to receive the viral data from the server and transmit the viral data to the reader device; and wherein the reader device is configured to receive the viral data from the mobile device.

Features of the aspect of the present application may include: wherein the one or more mobile devices and the reader device communicate via near field communication; wherein the system is at least one of an access control system, a payment system, and a transit system; wherein the reader device is further configured to transmit audit information to one of the mobile devices, wherein the server is further configured to receive the audit information from one of the mobile devices, and wherein the server is further configured to store the audit information in the database at the server; a computer configured to download at least a portion of the audit information from the database at the server.

Yet another aspect of the present application may include an apparatus, comprising: a server configured to receive information, store the information in a database at the server, determine a reader device that is to receive the information based on an analysis of the information, select one or more mobile devices to deliver the information to the reader device, and transmit viral data to the one or more mobile devices, wherein the viral data includes at least a portion of the information.

Features of the aspect of the present application may include: wherein the server is further configured to: host audit information for retrieval by a computer, wherein the server is further configured to: receive a notification message from one of the mobile devices, wherein the notification message indicates the reader device was successfully updated; and transmit a command to at least one other of the mobile devices to delete the viral data; wherein the information comprises updated access rights for the reader device; wherein the viral data includes a firmware update for the reader device; wherein the server is configured to select the one or more mobile devices based on which mobile devices have access to the reader device.

Another aspect of the present application may include method, comprising: transmitting a reader device identifier from a reader device to a mobile device via a wireless connection; receiving the reader device identifier at a server from the mobile device; determining via the server updated information for the reader device to receive based on an analysis of the reader device identifier, wherein the updated information is stored in a database at the server; and transmitting viral data to the mobile device, wherein the viral data includes at least a portion of the updated information.

Features of the aspect of the present application may include: transmitting the viral data to the reader device from the mobile device, wherein the viral data is transmitted to the reader device in a background operation of the mobile device; wherein the wireless connection is a BLUETOOTH connection; transmitting status information from the reader device to the mobile device; receiving the status information at the server from the mobile device; and storing the status information in the database at the server; downloading at least a portion of the audit information from the database at the server via a computer; advertising via the reader device to establish a connection with the mobile device via BLUETOOTH communication; receiving a mobile device identifier at the server from the mobile device; and analyzing the mobile device identifier and the reader device to determine whether to use the mobile device to communicate viral data to the reader device; wherein the information comprises a user database for the reader device; wherein the viral data includes a firmware update for the reader device.

Yet another aspect of the present application may include a system, comprising: a server configured to provide a cloud service; a mobile device; a reader device; and wherein the server is configured to: receive a reader device identifier from the mobile device; determine updated information for the reader device to receive based on an analysis of a reader device identifier, wherein the updated information is stored in a database at the server; and transmit viral data to the mobile device, wherein the viral data includes at least a portion of the updated information, wherein the mobile device is configured to receive the viral data from the server and transmit the viral data to the reader device; and wherein the reader device is configured to receive the viral data from the mobile device.

Features of the aspect of the present application may include: wherein the mobile device and the reader device communicate via BLUETOOTH; wherein the system is at least one of an access control system, a payment system, and a transit system; wherein the reader device is further configured to transmit status information to the mobile device, wherein the server is further configured to receive the status information from the mobile device, and wherein the server is further configured to store the status information in the database at the server; a computer configured to download at least a portion of the status information from the database at the server.

Another aspect of the present application may include an apparatus, comprising: a server configured to receive information, store the information in a database at the server, determine whether to transmit at least a portion of the information to a mobile device based on an analysis of a reader device identifier and a mobile device identifier, and transmit viral data to the mobile device, wherein the viral data includes at least a portion of the information.

Features of the aspect of the present application may include: wherein the server is further configured to: receive status information from the mobile device, wherein the status information includes data related to operation of the reader device; wherein the server is further configured to: host the status information for retrieval by a computer; wherein the information comprises a user database for the reader device; wherein the viral data includes a firmware update for the reader device; wherein server is configured to communicate with an application on the mobile device that operates as a background operation on the mobile device.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An access control system for transferring data, the access control system comprising:
   a server comprising a first processor and a first memory;
   a mobile device comprising a second processor and a second memory; and
   a reader device associated with an electronic lock and comprising a third processor and a third memory;
   wherein the first memory of the server includes a first plurality of instructions stored thereon that, in response to execution by the first processor, causes the server to:
      determine at least one particular reader device to receive updated data based on access control information stored at the server, wherein the at least one particular reader device includes the reader device;
      determine a first set of mobile devices of a plurality of mobile devices that interact with the at least one particular reader device most frequently;
      determine at least one mobile device of the first set of mobile devices to transfer the access control information from the server to the at least one particular reader device, wherein the at least one mobile device includes the mobile device; and
      transmit the access control information to the at least one determined mobile device;
   wherein the second memory of the mobile device includes a second plurality of instructions stored thereon that, in response to execution by the second processor, causes the mobile device to execute a background application to:
      transmit the access control information received from the server to the reader device;
      receive a confirmation message from the reader device indicating that the access control information has been successfully updated by the reader device; and
      transmit the confirmation message to the server; and
   wherein the third memory of the reader device includes a third plurality of instructions stored thereon that, in response to execution by the third processor, causes the reader device to transmit audit information to at least one mobile device of the plurality of mobile devices that is not in the first set of mobile devices.

2. The access control system of claim 1, wherein the first plurality of instructions further causes the server to transmit a command to each of the at least one determined mobile devices other than the mobile device to delete the access control information in response to receipt of the confirmation message.

3. The access control system of claim 1, wherein to transmit the access control information received from the server to the reader device comprises to transmit the access control information in response to a user of the mobile device attempting to access a secured room in a vicinity of the reader device.

4. The access control system of claim 1, wherein to determine the at least one mobile device to transfer the access control information comprises to determine each mobile device that has access to the at least one particular reader device.

5. The access control system of claim 1, wherein the second plurality of instructions further causes the mobile device to execute the background application to:
   receive reader device information from the reader device; and
   transmit the reader device information received from the reader device to the server.

6. The access control system of claim 5, wherein the reader device information comprises at least one of alarm information or audit information of the reader device.

7. The access control system of claim 5, wherein the reader device information comprises user tracking information that identifies when the mobile device makes a connection with the reader device.

8. The access control system of claim 5, wherein the reader device information comprises lock maintenance information.

9. The access control system of claim 1, wherein the access control information comprises a firmware update.

10. The access control system of claim 1, further comprising each reader device of the at least one particular reader device.

11. The access control system of claim 1, wherein the access control information comprises a database update.

12. The access control system of claim 1, wherein the at least one mobile device comprises a plurality of mobile devices.

13. A method for transferring data in an access control system, the method comprising:
   determining, by a server, at least one particular reader device to receive updated data based on access control information stored at the server;
   determining, by the server, a first set of mobile devices of a plurality of mobile devices that interact with the at least one particular reader device most frequently;
   determining, by the server, at least one mobile device of the first set of mobile devices to transfer the access control information from the server to the at least one particular reader device;
   transmitting, by the server, the access control information to the at least one determined mobile device;
   transmitting, via a background application executing in a mobile device of the at least one determined mobile device, the access control information received from the server to a reader device of the at least one particular reader device;
   receiving, via the background application of the mobile device, a confirmation message from the reader device indicating that the access control information has been successfully updated by the reader device;
   transmitting, via the background application of the mobile device, the confirmation message to the server; and
   transmitting, by the at least one particular reader device, audit information to at least one mobile device of the plurality of mobile devices that is not in the first set of mobile devices.

14. The method of claim 13, further comprising transmitting, by the server and in response to receipt of the confirmation message, a command to each of the at least one determined mobile devices other than the mobile device to delete the access control information.

15. The method of claim 13, wherein transmitting the access control information received from the server to the reader device comprises transmitting the access control information in response to a user of the mobile device attempting to access a secured room in a vicinity of the reader device.

16. The method of claim 13, wherein determining the at least one mobile device to transfer the access control information comprises determining each mobile device that has access to the at least one particular reader device.

17. The method of claim 13, further comprising:
receiving, via the background application of the mobile device, reader device information from the reader device; and
transmitting, via the background application of the mobile device, the reader device information received from the reader device to the server.

* * * * *